United States Patent [19]
Tomioka

[11] Patent Number: 5,661,598
[45] Date of Patent: Aug. 26, 1997

[54] OPTICAL INSTRUMENT

[75] Inventor: Ken Tomioka, Yokohama, Japan

[73] Assignee: Nikon Corporation, Tokyo, Japan

[21] Appl. No.: 339,227

[22] Filed: Nov. 10, 1994

[30] Foreign Application Priority Data

Nov. 18, 1993 [JP] Japan ................... 5-289420

[51] Int. Cl.⁶ ............... G02B 21/06; G02B 21/00
[52] U.S. Cl. ................. 359/388; 359/368; 359/380; 359/385
[58] Field of Search ............. 359/368, 372–381, 359/385–388, 600; 348/68; 606/2, 39, 46; 250/201.3, 201.7

[56] References Cited

U.S. PATENT DOCUMENTS

| | | | |
|---|---|---|---|
| 3,762,797 | 10/1973 | Heller | 359/375 |
| 4,565,428 | 1/1986 | Arndt et al. | 359/600 |
| 4,912,388 | 3/1990 | Tanaka et al. | 359/382 |
| 5,266,791 | 11/1993 | Morizumi | 250/201.3 |

FOREIGN PATENT DOCUMENTS 43133  1/1982  European Pat. Off. ........... 359/382

*Primary Examiner*—Thong Nguyen

[57] ABSTRACT

An optical instrument having an eyepiece unit through which a viewer is able to view an object, a switch provided on the eyepiece unit and a control device controlling an optical system in the eyepiece unit based on an output signal from the switch.

11 Claims, 3 Drawing Sheets

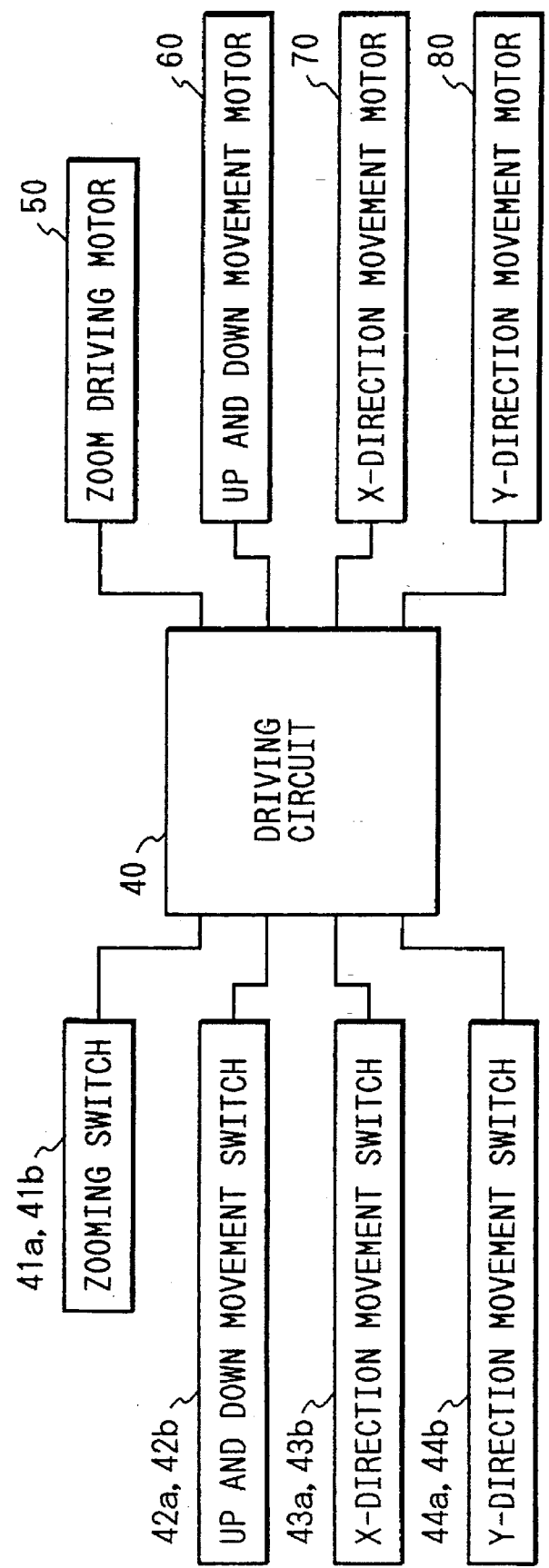

OPTICAL INSTRUMENT

BACKGROUND OF THE INVENTION

1. Field of the Invention

The present invention relates to an optical instrument equipped with a mechanism for moving a part or the whole of the optical instrument in order to view an object. The present invention also relates to an optical instrument equipped with, e.g., a focusing mechanism for adjusting a focal point of an optical system and a zoom drive mechanism for driving a zoom optical unit.

2. Related Background Art

In an operation-oriented microscope defined as one of optical instruments, a manipulation switch serves to manipulate the zoom drive mechanism for varying a magnification of a zoom optical system and an alignment mechanism for adjusting a relative position between the optical system and a viewed object. A foot switch manipulated by a foot of the operator and a voice-based input device have hitherto been employed as the manipulation switches. It is because both hands of the operator are occupied by operating tools during an operation, and the operator is therefore incapable of touching the manipulation switch for the zoom drive mechanism and the alignment mechanism by use of the hands. Hence, the operator, when using, e.g., the foot switch, performs a manipulation to align the operation-oriented microscope by installing the foot switch in the vicinity of the operator's foot, i.e., at a lower portion of an operation board on which the patient is laid.

As described above, however, when employing the foot switch, the relatively large foot switch has to be installed in the vicinity of the operator's foot, wherein there is often no allowance in terms of space. Further, a cord has to be arranged to extend from the foot switch to a power supply of the operation-oriented microscope. Therefore, for a convenience of the operation, when altering a positional relationship between the operator and the patient, the foot switch has to be shifted together with the cord. Accordingly a problem arises in which is quite troublesome to the operator.

Additional problems are that in the case of using the voice input device, this input device is highly expensive and, is incapable of distinguishing a subtle difference in pronunciation of the operator, resulting in a possibility to induce a critical manipulation mistake during the operation.

SUMMARY OF THE INVENTION

It is the primary objects of the present invention to provide an optical instrument exhibiting good usability, relatively low price and capable of eliminating manipulation mistakes.

To accomplish the above objects, according to one aspect of the invention, there is provided an optical instrument comprising an eyepiece unit through which a viewer sees, a switch provided on the eyepiece unit and a control device operated based on an output signal from the switch.

According to the present invention, a change mechanism for changing a viewing state can be manipulated by pushing the switches provided on the eyepiece unit with the peripheral parts of the eyes of the viewer himself or herself without using the hands or feet of the viewer himself or herself. This eliminates the necessity for a foot switch or the like. Consequently, there is produced an allowance in terms of space around a foot of the viewer, and, at the same time, the viewer does not have to perform a troublesome action such as moving the foot switch.

Further, an expensive device such as a voice input device, etc. does not have to be employed, and manufacturing costs can be kept low.

BRIEF DESCRIPTION OF THE DRAWINGS

Other objects and advantages of the present invention will become apparent from review of the following discussion in conjunction with the accompanying drawings, in which:

FIG. 3 is a block diagram of a control system of the present invention.

DESCRIPTION OF THE PREFERRED EMBODIMENTS

A preferred embodiment of an optical instrument according to the present invention will hereinafter be discussed with reference to the accompanying drawings which were briefly described above.

Figure 1:
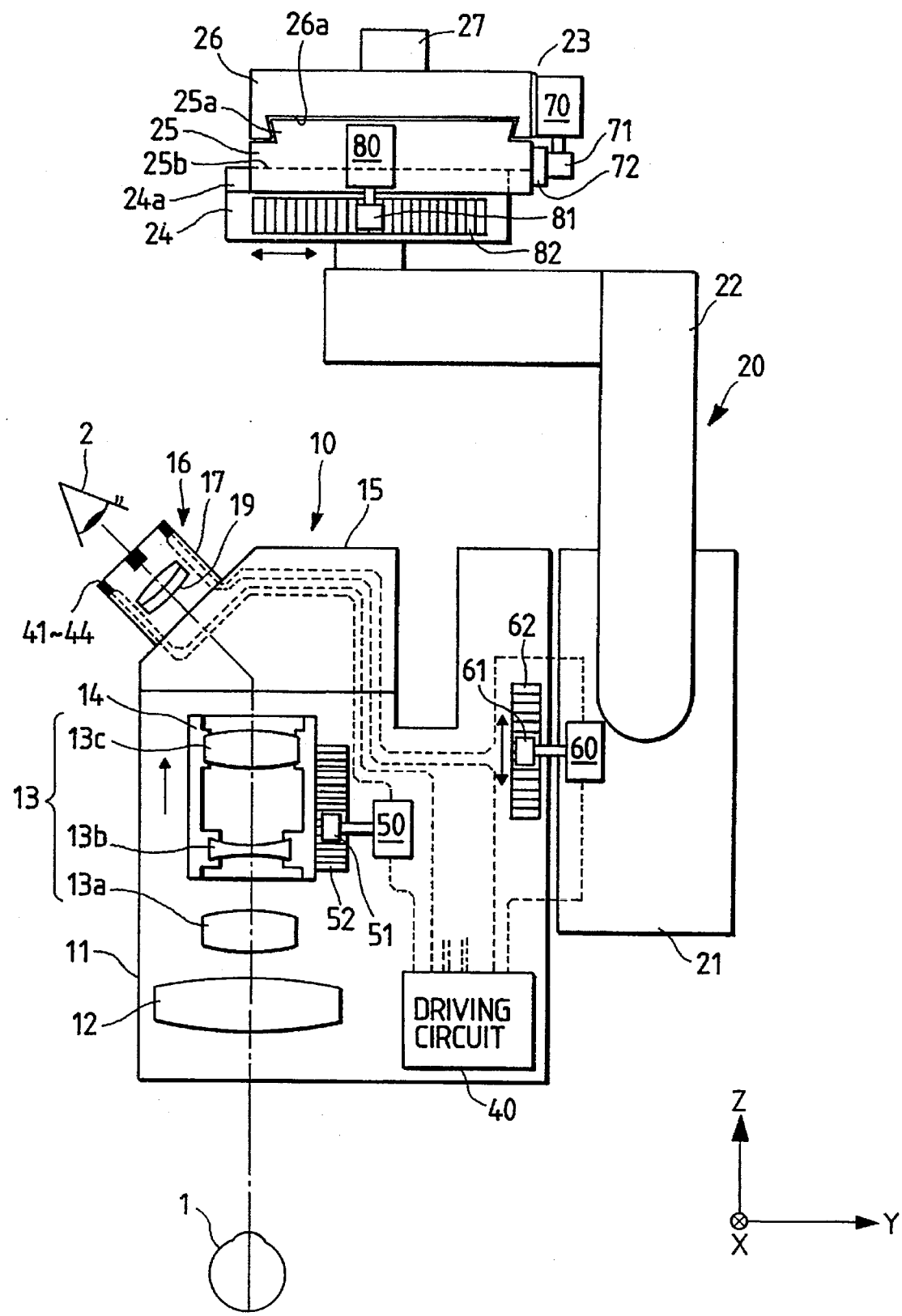
FIG. 1 is an explanatory view schematically illustrating a construction of an ophthalmological operation-oriented microscope according to a preferred embodiment of the present invention.

The optical instrument in the present preferred embodiment is, as illustrated in FIG. 1, defined as a microscope for an ophthalmological operation. The operation-oriented microscope is, as depicted in FIG. 1, includes an optical instrument body 10 for housing an optical system and a support board 20 for supporting optical instrument body 10.

The optical instrument body 10 has a body lens unit 11 and an eyepiece lens barrel 15. The body lens unit 11 incorporates an optical system, i.e., an objective optical unit 12 and a zoom optical unit 13. The zoom optical unit 13 includes two sets of the same optical systems to three-dimensionally view an examined eye 1. Further, the eyepiece lens barrel 15 is provided with an optical system, viz., a deflection optical unit (not shown) housed in lens barrel 15 and an eyepiece unit 16 attached outwardly of lens barrel 15. Each of the deflection optical unit and the eyepiece unit 16 also includes two sets of the same optical systems to three-dimensionally view the examined eye 1.

Lens elements constituting the zoom optical unit 13 are fixed to a lens frame. A rack 52 is formed on a lens frame 14 of specified lenses 13b, 13c among these lenses 13a, 13b, 13c. The configuration is such that a pinion 51 meshes with rack 52, and the lenses 13b, 13c are movable together with the lens frame 14 in an optical-axis direction with rotations of the pinion 51. The pinion 51 is secured to a drive shaft of a zoom driving motor 50.

A support board 20 has a connecting member 21 connected to the optical instrument body 10, an arm member 22, an XY-movement unit 23 and a base unit 27 for supporting these components. An up-and-down movement motor 60 is fitted to the connecting member 21 of the support board 20. A pinion 61 is attached to a drive shaft of motor 60. This pinion 61 engages with a rack 62 formed on the optical instrument body 10. Rack 62 extends in up-and-down directions (Z-directions).

The XY-movement unit 23 comprises a base table 26 fixed to the base unit 27 and an X-direction movement table 25 mounted so as to be movable in a horizontal direction (X-direction) with respect to the base table 26. The XY-movement unit 23 also comprises an X-direction movement motor 70 for moving the X-direction movement table 25 in the X-direction, a Y-direction movement table 24 mounted so as to be movable in a direction (Y-direction) perpendicular to the moving direction of table 25 and a Y-direction movement motor 80 for moving the Y-direction movement table 24 in the Y-direction. The base table 26 is formed with a recessed portion 26a extending in the X-direction. The X-direction movement table 25 is formed with a protruded portion 25a slidably engaging with the recessed portion 26a of the base table 26. The X-direction movement motor 70 is fixed to the base table 26. A pinion 71 is secured to a drive shaft of motor 70. This pinion 71 meshes with a rack 72 extending in the X-direction but formed on the X-direction movement table 25. The X-direction movement table 25 is formed with a recessed portion 25b extending in the Y-direction. The Y-direction movement table 24 is formed with a protruded portion 24a slidably engaged with the recessed portion 25b of the X-direction movement table 25. The Y-direction movement motor 80 is fixed to the X-direction movement table 25. A pinion 81 is secured to a drive shaft of motor 80. Pinion 81 meshes with a rack 82 extending in the Y-direction but provided on the Y-direction movement table 24. The Y-direction movement table 24 is fixed to an end portion of the arm member 22.

The optical instrument body 10 incorporates a drive circuit 40 for driving the individual motors 50, 60, 70, 80. Furthermore, the eyepiece unit 16 of the optical instrument body 10 is equipped with a plurality of switches 41, 42, 43, 44 for generating drive signals for driving the respective motors 50, 60, 70, 80. Giving more specific descriptions with reference to FIG. 2, the eyepiece unit 16 is equipped with zooming switches 41a, 41b, up-and-down movement switches 42a, 42b, X-direction movement switches 43a, 43b and Y-direction movement switches 44a, 44b.

Referring now to FIG. 3 therein depicted is a block diagram illustrating a control system of the present preferred embodiment.

Connected to control circuit 40 are, as illustrated in FIG. 3, the zooming switch 41, the up-and-down movement switch 42, the X-direction movement switch 43 and the Y-direction movement switch 44.

Furthermore, the motors 50, 60, 70, 80 are also connected to the control circuit 40.

The control circuit 40 drives the zoom drive motor 50 in accordance with the drive signals transmitted from the zooming switches 41a, 41b. The control circuit 40 also drives the up-and-down movement motor 60 in accordance with the drive signals from the up-and-down movement switches 42a, 42b. The control circuit 40 further drives the X-direction movement motor 70 in accordance with the drive signals from the X-direction movement switches 43a, 43b. The control circuit 40 also drives the Y-direction movement motor 80 in accordance with the drive signals from the Y-direction movement switches 44a, 44b.

Figure 2:
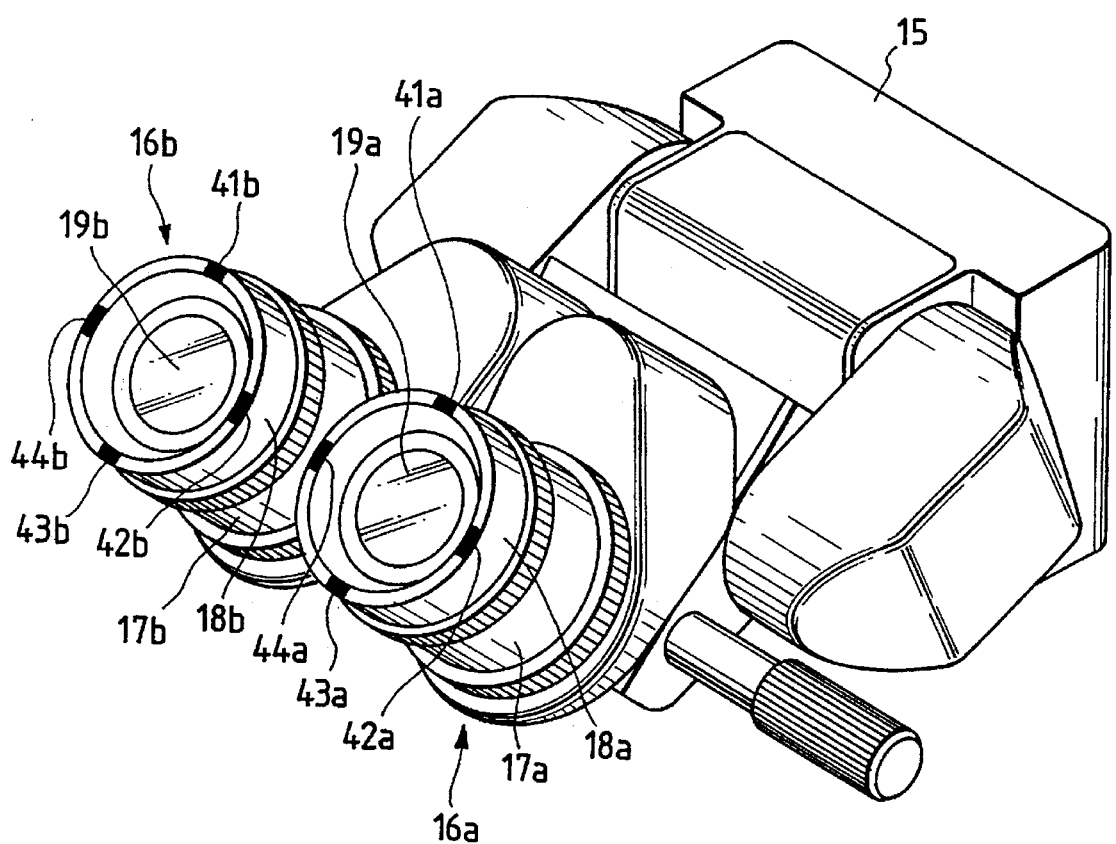
FIG. 2 is a perspective view of an eyepiece unit of the ophthalmological operation-oriented microscope depicted in FIG. 1.

A pair of eyepiece units 16a, 16b are, as shown in FIG. 2, constructed of eyepieces 19a, 19b, eyepiece frames 17a, 17b and light-shield eye-set rings 18a, 18b. The light-shield eye-set rings 18a, 18b serve to ensure optical paths between operator's eyes 2 and the eyepieces 19a, 19b and, on the other hand, prevent the outside light from entering optical paths. The above-mentioned switches 41a, 41b, 42a, 42b, 43a, 43b, 44a, 44b are disposed in positions, each bearing a face-to-face relationship with the peripheries of the operator's eyes 2, and the light-shield eye-set rings 18a, 18b. The periphery of the eye implies parts in the vicinities of an eyebrow, a temple, a cheek and an eyebrow-to-eyebrow portion.

It is required that a zooming operation, up-and-down movements and X- and Y-direction movements be performed respectively in positive/negative directions (magnifying/reducing, up-and-down, positive/negative, positive/negative). For this purpose, in the right-side eyepiece unit 16a, the light-shield eye-set ring 18a is equipped with the zooming switch 41a for causing a motion in a positive direction, the up-and-down movement switch 42a for causing a motion in the positive direction, the X-direction movement switch 43a for causing a motion in the positive direction and the Y-direction movement switch 44a for causing a motion in the positive direction.

The zooming switch 41a is provided so as to contact the part in close proximity to the operator's right eyebrow. The up-and-down movement switch 42a is provided so as to contact the part in the vicinity of the operator's right temple. The X-direction movement switch 43a is so provided as to contact the operator's right cheek. The Y-direction movement switch 44a is provided so as to contact the part in the vicinity of the eyebrow-to-eyebrow portion.

Furthermore, in the left-side eyepiece unit 16b, the light-shield eye-set ring 18b is equipped with the zooming switch 41b for causing a motion in a negative direction, the up-and-down movement switch 42b for causing a motion in the negative direction, the X-direction movement switch 43b for causing a motion in the negative direction and the Y-direction movement switch 44b for causing a motion in the negative direction.

The zooming switch 41b is provided so as to contact the part in the close proximity to the operator's left eyebrow. The up-and-down movement switch 42b is provided so as to contact the part in the vicinity of the operator's eyebrow-to-eyebrow portion. The X-direction movement switch 43b is so provided as to contact the operator's left cheek. The Y-direction movement switch 44b is so provided as to contact the part in the vicinity of the operator's left temple.

The Y-direction movement switch 44a and the up-and-down movement switch 42b are mounted on the light-shield eye-set rings 18a, 18b in such a way that the switches 44a, 42b pinch the operator's nose; the switch 44a is brought into contact with the right side of the nose close to the eyebrow-to-eyebrow portion; and the switch 42b is brought into contact with the left side of the nose close to the eyebrow-to-eyebrow portion. Accordingly, the vicinity of the eyebrow-to-eyebrow portion implies the right-and-left sides of the nose close to the eyebrow-to-eyebrow portion.

Note that the respective switches 41a, 41b, 42a, 42b, 43a, 43b, 44a, 44b involve the use of, e.g., microswitches as push button switches and are constructed to output drive signals during depressions of these switches.

A strain gauge may be used in place of microswitches. Given hereinbelow is a detailed explanation of a case where the strain gauge is employed instead of a microswitch.

The strain gauge exhibits such a nature that an electric resistance varies when a strain is produced. When employed as a switch, the strain gauge is constructed to detect the variation in the electric resistance and transmit a drive signal to the drive circuit 40. In this case, the strain gauge is stuck to the eyepiece unit 16 in a contact-position when the operator views through the eyepiece unit in the face-to-face relationship with the above-stated parts in the vicinities of the eyebrows, the temples, cheeks and the eyebrow-to-eyebrow portion. The strain gauge may be constructed to generate the drive signal when the operator contacts the strain gauge stuck to the eyepiece unit 16.

Furthermore, the right-side eyepiece unit 16a is equipped with the manipulation switches 41a, 42a, 43a, 44a for causing the motions in the positive direction, while the left-side eyepiece unit 16b is equipped with the manipulation switches 41b, 42b, 43b, 44b for causing the motions in the negative direction. For example, however, the up-movement switch 42a and the down-movement switch 42b may be provided at the upper and lower portions of one eyepiece unit 16 of the right- and left-side eyepiece units.

Note that a focusing mechanism in the present preferred embodiment comprises the up-and-down movement motor 60, the pinion 61 secured to the drive shaft of motor 60, the rack 62 engaging with pinion 61 and the drive circuit 40. Furthermore, a relative position adjusting mechanism comprises the X-direction movement motor 70, the Y-direction movement motor 80, the pinions 71, 81 secured to motors 70, 80, the racks 72, 82 meshing with pinions 71, 81 and the drive circuit 40. Also, a zoom drive mechanism is constructed of the zoom drive motor 50, the pinion 51 secured to the drive shaft of this motor 50, the rack 52 meshing with this pinion 51 and the drive circuit 40.

Next, the operation of this present preferred embodiment will be explained.

When viewing an eye 1 of a patient, the action starts with setting the ophthalmological operation-oriented microscope in accordance with this present preferred embodiment in the vicinity of the patient's eye 1. Next, the optical instrument body 10 is moved in the X- and Y-directions so that the optical axis of the optical system is positioned on the examined eye 1.

When the optical instrument body 10 is, in the case of making movements in the X- and Y-directions, moved, e.g., in the (+) X-direction, the operator pushes the X-direction movement switch 43a of the right-side eyepiece unit 16a with the part in the vicinity of the right cheek. Thereafter, the drive signal is inputted from switch 43a to the X-direction movement motor 70 via the drive circuit 40 (as a matter of fact, the motor 70 is brought into a conductive state with respect to the drive circuit 40), thereby driving the X-direction movement motor 70. The X-direction movement motor 70 is driven, and, when the pinion 71 attached to the drive shaft of motor 70 rotates, the X-direction movement table 25 moves in the (+) X-direction together with the rack 72 meshing with pinion 71. As a result, the optical instrument body 10 moves in the (+) X-direction.

Furthermore, when trying to move the optical instrument body 10 in the (−) Y-direction, the operator pushes the Y-direction movement switch 44b on the left-side eyepiece unit 16b with the part in the vicinity of the left temple. Accordingly, the drive signal transmitted from the switch 44b acts to drive the Y-direction movement motor 80, thereby moving the Y-direction movement table 24 in the (−) Y-direction.

Subsequently, the optical system of the optical instrument is focused on the examined eye 1. In this case, as in the same way with other manipulation switches, any one of the up-and-down movement switches 42a, 42b of the eyepiece unit 16 is pushed by the part in the vicinity of the eyebrow. Accordingly, the up-and-down movement motor 80 is driven by the drive signal from the up-and-down movement switch 42a or 42b, thereby moving the optical instrument body 10 up and down. The takes place with the up-and-down movements of the optical instrument body 10.

When focused on the examined eye 1, the operation actually starts. However, when increasing a magnifying power, any one of the zooming switches 41a, 41b of the eyepiece units 16a, 16b is depressed. Thereafter, the zoom drive motor 50 is driven by the drive signal from the switch 41a or 41b. Then, the lenses 13b, 13c constituting the zoom optical unit 13 are moved to obtain a target magnification.

In the case of moving a magnified portion during the operation, as stated above, the optical instrument body 10 is moved in the X- or Y-direction by pushing the X-direction movement switch 43 or the Y-direction movement switch 44 while viewing through the eyepiece 19.

As discussed above, in accordance with this present preferred embodiment, the individual switches 41, 42, 43, 44 are pushed by the peripheral parts (in the vicinities of the eyebrows, the temples, the cheeks and the eyebrow-to-eyebrow portion) of the eyes 2 of the operator himself or herself. It is thus possible to perform the zooming action, the up-and-down movements (focusing) and X- and Y-direction movements. That is, the operator is capable of conducting a variety of manipulations of the microscope by use of the peripheral parts of the eyes of the operator himself or herself without using both hands and both feet.

Accordingly, the present invention eliminates the necessity for a foot switch or the like, with the result that an allowance in terms of space is produced around the feet of the operator, and, at the same time, the operator does not have to effect a troublesome action such as moving the foot switch. Further, an expensive device such as a voice input device, etc. does not have to be used, and, therefore, manufacturing costs can be kept low.

Note that the drive circuit 40 is incorporated into the optical instrument body 10 in the embodiment discussed above but may be mounted on the support board 20. Furthermore, the racks 52, 62, 72, 82 and the pinions 51, 61, 71, 81 are employed as mechanical drive mechanism components in all the drive mechanisms in this the present preferred embodiments of the invention embodiment. The present invention is not, however, confined to those embodiment details described above, and, for instance, a cam or the like may be used.

As a matter of course, the present invention is also, as in the embodiments discussed above, applicable to all optical instruments each incorporating the mechanism for moving some or the whole of the optical system.

It is apparent that, in the present invention, a wide range of different working modes can be formed based on the invention without deviating from the spirit and scope of the invention. The present invention is not restricted by its specific working modes except by being limited by the appended claims and their equivalents.

What is claimed is:

1. An optical instrument having a plurality of drive motors, the optical instrument comprising:

an eyepiece unit through which a viewer is able to inspect an object;

a plurality of switches provided on said eyepiece unit, each of said switches producing an output signal to drive one of the plurality of drive motors when said switch contacts the face of the viewer; and a control device for controlling the plurality of drive motors of the optical instrument based on said output signals from said plurality of switches.

2. An optical instrument, comprising:

an eyepiece unit through which a viewer is able to inspect an object;

an optical system by which the viewer views the object to be viewed through said eyepiece unit;

a plurality of manipulation switches which are activated by the face of the viewer when the viewer inspects the object through the eyepiece unit, each manipulation switch outputting a drive signal when the face of the viewer activates said manipulation switch; and a control device for altering a plurality of relative positional relationships between the viewed object and said optical system on the basis of drive signals from said manipulation switches, each manipulation switch altering one relative positional relationship.

3. The optical instrument according to claim 2, wherein said control device includes a focusing mechanism for performing focusing on the viewed object.

4. The optical instrument according to claim 2, wherein said optical system includes a zoom optical system for varying a magnification when viewing, and said control device has a magnification adjusting mechanism for adjusting the magnification of said zoom optical system.

5. The optical instrument according to claim 2, wherein each manipulation switch is a microswitch.

6. The optical instrument according to claim 2, wherein each manipulation switch is a strain gauge device.

7. An optical instrument comprising:

a pair of eyepiece units through which both eyes of a viewer are respectively able to inspect an object;

an optical system by which the viewer views the object to be viewed through said eyepiece units;

a first manipulation switch, provided in a position bearing a face-to-face relationship with the face of the viewer when one of the eyes of the viewer sees through said one eyepiece unit, for generating a first drive signal;

a second manipulation switch, provided in the face-to-face relationship with the face of the viewer when the other eye of the viewer sees through said other eyepiece unit, for generating a second drive signal; and a control device for controlling a relative positional relationship between the viewed object and said optical system on the basis of the first signal from said first manipulation switch and the second drive signal from said second manipulation switch.

8. The optical instrument according to claim 7, wherein the first drive signal controls the relative positional relationship between the viewed object and said optical system to a positive direction, and the second drive signal controls the relative positional relationship between the viewed object and said optical system to set some or the whole of said optical system in a negative direction.

9. The optical instrument according to claim 7, wherein said first and said second manipulation switches are manipulated by the face of the viewer to thereby output the first and second drive signals.

10. An operation-oriented optical instrument comprising:

an optical system for producing an image of a diseased part;

an eyepiece unit for viewing the image produced by said optical system;

a zoom movement unit for causing the optical system to zoom relative to the diseased part;

an XY movement unit for causing the optical system to move in an X and a Y direction relative to the diseased part;

an up-down movement unit for causing the optical system to move up and down relative to the diseased part;

a plurality of switches positioned on said eyepiece unit, said switches operating based upon contact with a face of an observer; and a control unit adapted to drive said zoom movement unit, said XY movement unit and said up-down movement unit based on the operation of said plurality of switches.

11. An optical instrument, comprising:

two eyepiece units into which eyes of a viewer look;

a first eye cup with which a face of the viewer comes into contact when one of the eyes of the viewer looks into one of said eyepiece units;

a second eye cup with which the face of the viewer comes into contact when the other of the eyes of the viewer looks into the other of said eyepiece units;

an optical system by which the viewer views an object through said eyepiece units;

a first operation switch provided on said first eye cup which is operated by the viewer's face when the viewer looks into said eyepiece units;

a second operation switch provided on said second eye cup which is operated by the viewer's face when the viewer looks into said eyepiece units;

a driving unit for providing relative movement between said object and said optical system; and a control unit for providing a relative movement between said object and said optical system in a first direction based on an operation of said first operation switch, and for providing a relative movement between said object and said optical system in a second direction different from said first direction based on an operation of said second operation switch.

* * * * *